(12) United States Patent
Kruglick

(10) Patent No.: US 8,849,757 B2
(45) Date of Patent: Sep. 30, 2014

(54) DETERMINING USER KEY-VALUE STORAGE NEEDS FROM EXAMPLE QUERIES

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/640,469

(22) PCT Filed: Mar. 29, 2012

(86) PCT No.: PCT/US2012/031317
§ 371 (c)(1),
(2), (4) Date: Oct. 10, 2012

(87) PCT Pub. No.: WO2013/147821
PCT Pub. Date: Oct. 3, 2013

(65) Prior Publication Data
US 2013/0262382 A1 Oct. 3, 2013

(51) Int. Cl.
*G06F 7/00* (2006.01)
*G06F 17/00* (2006.01)
*G06F 17/30* (2006.01)

(52) U.S. Cl.
CPC .... *G06F 17/30079* (2013.01); *G06F 17/30306* (2013.01)
USPC .......................................................... 707/634

(58) Field of Classification Search
None
See application file for complete search history.

(56) References Cited

U.S. PATENT DOCUMENTS

| | | | |
|---|---|---|---|
| 1,331,018 A * | 2/1920 | Luthy | 429/143 |
| 4,356,549 A | 10/1982 | Chueh et al. | |
| 7,499,907 B2 | 3/2009 | Brown et al. | |
| 7,698,324 B2 * | 4/2010 | Vries | 707/698 |
| 2004/0024720 A1 * | 2/2004 | Fairweather | 706/46 |
| 2008/0005144 A1 * | 1/2008 | Katz et al. | 707/101 |
| 2008/0037777 A1 * | 2/2008 | Ignatius et al. | 380/44 |
| 2008/0115123 A1 * | 5/2008 | Kelly et al. | 717/177 |
| 2009/0254529 A1 * | 10/2009 | Goldentouch | 707/3 |
| 2010/0250497 A1 * | 9/2010 | Redlich et al. | 707/661 |
| 2010/0321183 A1 * | 12/2010 | Donovan et al. | 340/540 |
| 2010/0332479 A1 * | 12/2010 | Prahlad et al. | 707/741 |
| 2010/0333116 A1 * | 12/2010 | Prahlad et al. | 719/328 |
| 2011/0040876 A1 * | 2/2011 | Zhang et al. | 709/226 |
| 2011/0078211 A1 * | 3/2011 | Gass et al. | 707/803 |

(Continued)

OTHER PUBLICATIONS

International Search Report and Written Opinion for PCT/US12/31317, filed Mar. 29, 2012, mailed on Jun. 21, 2012.

(Continued)

*Primary Examiner* — Robert Beausoliel, Jr.
*Assistant Examiner* — Nicholas Allen
(74) *Attorney, Agent, or Firm* — Turk IP Law, LLC

(57) ABSTRACT

Technologies are generally provided for conveying tree and index needs of a database by collecting and forwarding a statistically representative set of data requests so that a new datacenter can use its existing auto-learning and adjustment techniques to create local indices before receiving its first real or live requests. In some examples, requests at an origin datacenter may be collected to provide a small population of queries that are representative of a larger population of queries. Filters and/or anonymizers may be employed to adhere to data sharing rules and restrictions while still allowing a new datacenter to build indices and test performance. Thus, the new datacenter may be trained asynchronously from another site and without actual data changing hands. Training and testing of destination database services may be completed before committing to customer migration.

19 Claims, 7 Drawing Sheets

(56) References Cited

U.S. PATENT DOCUMENTS

| | | | |
|---|---|---|---|
| 2011/0126197 A1* | 5/2011 | Larsen et al. ..................... | 718/1 |
| 2011/0179175 A1* | 7/2011 | Ravichandran et al. ...... | 709/226 |
| 2011/0179415 A1* | 7/2011 | Donnellan et al. ................ | 718/1 |
| 2011/0191361 A1* | 8/2011 | Gupta et al. .................. | 707/763 |
| 2011/0208710 A1* | 8/2011 | Lesavich ....................... | 707/706 |
| 2011/0225143 A1* | 9/2011 | Khosravy et al. ............. | 707/713 |
| 2011/0252016 A1* | 10/2011 | Shacham et al. ............. | 707/706 |
| 2012/0022910 A1* | 1/2012 | Chi et al. ...................... | 705/7.22 |
| 2012/0054325 A1* | 3/2012 | Backa .......................... | 709/223 |
| 2012/0066395 A1 | 3/2012 | Ellis et al. | |
| 2012/0072640 A1 | 3/2012 | Crawford et al. | |
| 2012/0117054 A1* | 5/2012 | Shrinivas et al. ............. | 707/713 |
| 2012/0137001 A1* | 5/2012 | Ferris et al. .................. | 709/226 |
| 2012/0266167 A1* | 10/2012 | Spiers et al. ....................... | 718/1 |
| 2013/0166550 A1* | 6/2013 | Buchmann et al. ........... | 707/736 |

OTHER PUBLICATIONS

Oracle Database, Advanced Application Developer's Guide 11g Release1 (11.1) B28424-03; Example: http://docs.oracle.com/cd/B28359_01/appdev.111/b28424/adfns_indexes.htm; Aug. 1, 2008.

Chapman, The Enterprise Cloud, Create database maintenance plans in SQL Server 2005 using SSIS; Dec. 3, 2007. http://www.techrepublic.com/blog/datacenter/create-database-maintenance-plans-in-sql-server-2005-using-ssis/248.

Symantec; How to move the Index location to a different Enterprise Vault (EV) server in the same site. Article: TECH51450, Aug. 9, 2011. http://www.symantec.com/business/support/index?page=content&id=TECH51450.

* cited by examiner

COMPUTER PROGRAM PRODUCT 700

SIGNAL-BEARING MEDIUM 702

704 AT LEAST ONE OF

ONE OR MORE INSTRUCTIONS FOR RECEIVING TRAINING QUERIES FROM ORIGINAL DATACENTER;
ONE OR MORE INSTRUCTIONS FOR TRAINING INDICES;
ONE OR MORE INSTRUCTIONS FOR TESTING NEW INDICES;
ONE OR MORE INSTRUCTIONS FOR WHEN READY FOR LIVE USE, RECEIVING HASH TRANSLATION TABLE; AND
ONE OR MORE INSTRUCTIONS FOR UN-HASHING THE INDICES.

| COMPUTER-READABLE MEDIUM 706 | RECORDABLE MEDIUM 708 | COMMUNICATIONS MEDIUM 710 |

FIG. 7

DETERMINING USER KEY-VALUE STORAGE NEEDS FROM EXAMPLE QUERIES

BACKGROUND

Unless otherwise indicated herein, the materials described in this section are not prior art to the claims in this application and are not admitted to be prior art by inclusion in this section.

With the advance of networking and data storage technologies, an increasingly large number of computing services are being provided to users or customers by cloud-based datacenters that can enable access to computing resources at various levels. Cloud-based service providers may provide individuals and organizations with a range of solutions for systems deployment and operation. Depending on customer needs, datacenter capabilities, and associated costs, services provided to customers may be defined by Service Level Agreements (SLAs) describing aspects such as server latency, storage limits or quotas, processing power, scalability factors, backup guarantees, uptime guarantees, resource usage reporting, and similar ones.

There are many scenarios, where one datacenter may need to express to another datacenter needs or preferences of a customer. For a transferred data store to perform well at a new destination, the destination datacenter may need to build effective indices, trees, and duplication.

Datacenters generally have different behind-the-scenes implementations of their data storage such that direct copying of trees and indices from one datacenter to another is often not practical or even viable, a development that has partially evolved to suit differing business models and hardware legacies. With the lack of a general approach to turn an existing set of indices (with their associated cardinalities) back into a definition that a new datacenter can then use to construct a set of indices in a new system, customers may be forced to tolerate lower performance during new index development.

SUMMARY

The present disclosure generally describes technologies for determining user key-value storage needs by providing a population of example queries.

According to some examples, a method for determining customer key-value storage needs through example queries in transfers between cloud computing environments may include receiving training queries from an origin datacenter, training new indices for a target datacenter, testing the new indices for performance at the target datacenter, and activating an index database at the target datacenter with the new indices in response to receiving a request for customer migration.

According to other examples, a computing device for determining customer key-value storage needs through example queries in transfers between cloud computing environments may include a memory configured to store instructions and a processing unit configured to execute a training module in conjunction with the instructions. The training module may receive training queries from an origin datacenter, train new indices for a target datacenter, test the new indices for performance at the target datacenter, and activate an index database at the target datacenter with the new indices in response to receiving a request for customer migration.

According to further examples, a computer-readable storage medium may have instructions stored thereon for determining customer key-value storage needs through example queries in transfers between cloud computing environments. The instructions may include receiving training queries from an origin datacenter, training new indices for a target datacenter, testing the new indices for performance at the target datacenter, and activating an index database at the target datacenter with the new indices in response to receiving a request for customer migration.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein.

DETAILED DESCRIPTION

Figure 1:
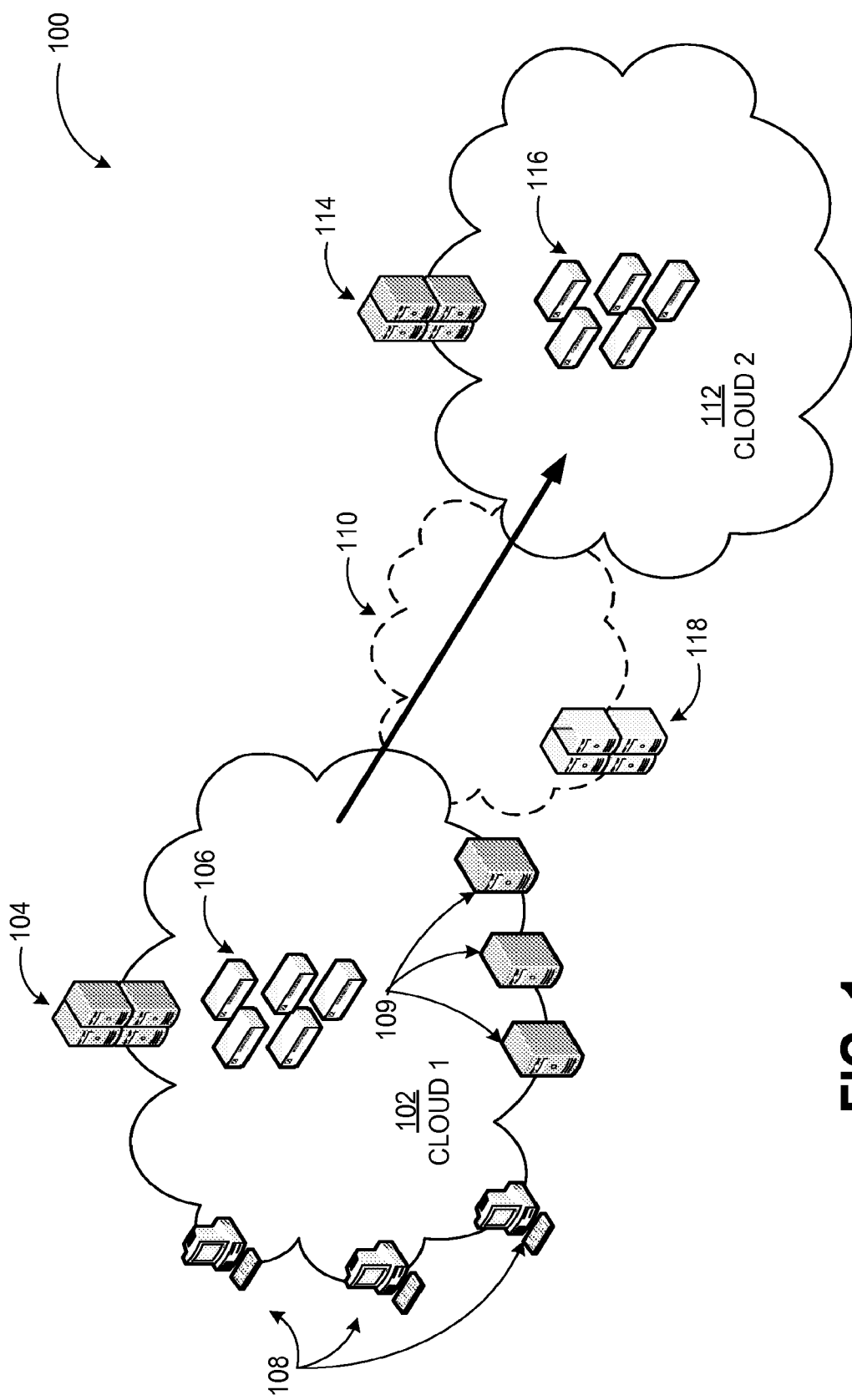
FIG. 1 illustrates an example system, where user key-value storage needs may be determined for customer migration by providing a population of example queries.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to determining user key-value storage needs by providing a population of example queries.

Briefly stated, technologies are generally provided for conveying tree and index needs of a database by collecting and forwarding a statistically representative set of data requests so that a new datacenter can use its existing auto-learning and adjustment techniques to create local indices before receiving its first real or live requests. Requests at an origin datacenter may be collected to provide a small population of queries that are representative of a larger population of queries. Filters and/or anonymizers may be employed to adhere to data sharing rules and restrictions while still allowing a new datacenter to build indices and test performance. Thus, the new datacenter may be trained asynchronously from another site and without actual data changing hands. Training and testing of destination database services may be completed before committing to customer migration.

FIG. 1 illustrates an example system, where user key-value storage needs may be determined for customer migration by providing a population of example queries, arranged in accordance with at least some embodiments described herein.

As shown in a diagram 100, an origin datacenter 102 (cloud 1) may host services such as various applications, data storage, data processing, or comparable ones for individual or enterprise customers 108 and 109. The origin datacenter 102 may include one or more datacenters providing the services and employ one or more servers 104 and/or one or more special purpose devices 106 such as firewalls, routers, physical or virtual data stores, session border controllers, and so on. Thus, an application hosted or data stored by the origin datacenter 102 for a customer may involve a complex architecture of hardware and software components. The service level provided to the customer (owner of the hosted application or data) may be determined based on a number of service parameters such as server processing, memory, and networking, which may be implemented in a particular way by the origin datacenter 102.

Cloud-based service providers may have disparate architectures and provide similar services but with distinct parameters. For example, data storage capacity, processing capacity, server latency, and similar aspects may differ from cloud to cloud. When migrating customer data from one datacenter to another (or in other words from one cloud to another) the destination datacenter may need to build effective indices, trees, and duplication. A database index may improve the speed of data retrieval at the cost of increased storage space. A database as used herein includes a key value store, a distributed hash data storage (DHASH), and similar data stores. Indices, with their associated trees and duplication, are the main determiner of database performance. Example embodiments provide techniques for training and testing new indices at a target datacenter without moving actual customer data, thus enabling the customer(s) to test potential datacenters for actual performance prior to enduring the risk of moving their data.

In the diagram 100, the origin datacenter 102 (cloud 1) may be a source cloud and a target datacenter 112 (cloud 2) may be a destination cloud in a migration process. Similar to the origin datacenter 102, the target datacenter 112 may also employ one or more servers 114 and one or more special purpose devices 116 to provide its services. Training of new indices and testing at the target datacenter 112 based on training queries collected at the origin datacenter 102 to represent queries of that datacenter may be managed and performed by one of the servers 104 of the origin datacenter 102, one of the servers 114 of the target datacenter 112, or by a third party service executed on one or more servers 118 of another cloud 110.

Figure 2:
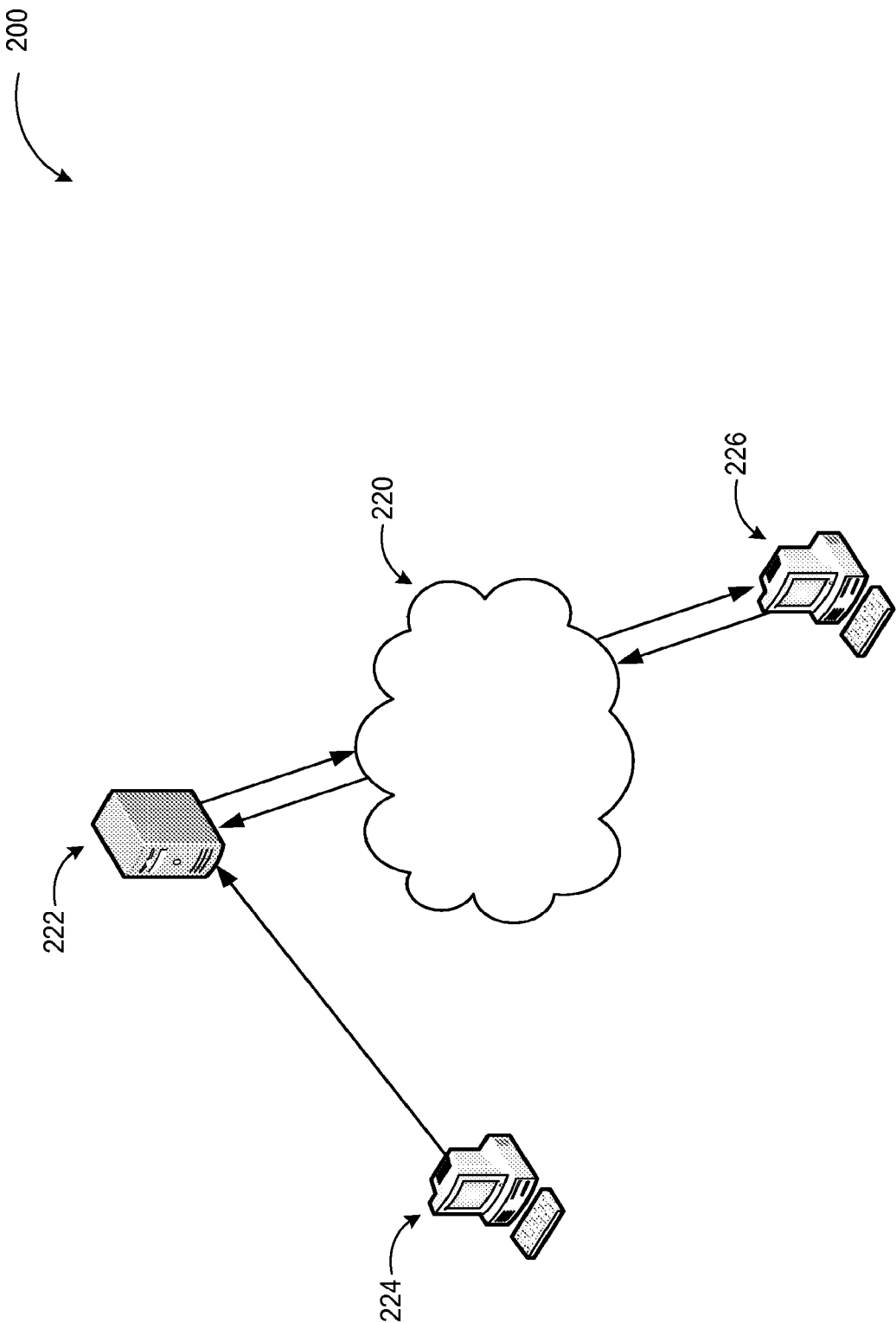
FIG. 2 illustrates example interactions for collection of representative queries to determine user key-value storage needs.

FIG. 2 illustrates example interactions for collection of representative queries to determine user key-value storage needs, arranged in accordance with at least some embodiments described herein.

In migrating customer data from an origin datacenter to a destination datacenter, an index and storage structure suitable to the customer, without the customer having to tolerate lower performance during the index development, is provided in some example embodiments. An example system may also honor privacy and/or security rules such as medical record or payment card industry (PCI) requirements by minimizing data proliferation while also giving the customer a chance to verify performance before switching live service. A process according to example embodiments may begin with collecting representative queries at the origin datacenter, which involves a query submittal process. An example query submittal process is described below.

In an example scenario depicted in a diagram 200, a database owner (e.g., customer) represented by a computing device 224 may make its data available for search providing an index server 222 with search structures, while a querier represented by a computing device 226 submits keyword queries anonymously to the index server 222 via a query router system 220. The index server 222 may send back the search results though the query router system 220.

The database owner (computing device 224) may generate a search structure computed from (an encryption of) his/her data and send to the index server 222. This structure may enable the index server 222 to answer (encrypted) queries but not reveal information about the provided database. Outsourcing the search to the index server 222 may prevent the database owner from finding out the results to encrypted queries. The index server may see the results, but not know what documents they correspond to. At most, the index server 222 may be able to tell when two submitted queries have overlapping results, which may be mitigated by preserving the anonymity of the queriers (the computing device 226) with respect to the index server 222.

The query router system 220, which serves as an intermediary in the communication path between the querier and the index server 222 may guarantee that only authorized users are submitting queries. The query router system 220 may be trusted to know and protect the identities of the participants, while enforcing correct authorization before allowing queries to reach the index server 222. However, the query router system 220 may not be trusted to see the content of the queries or results. Thus, the querier (the computing device 226) may submit an encrypted query to the query router system 220, which checks the authorization of the user, transforms the query, and forwards it to the index server 222. The index server 222 may send back search results to the query router system 220, which may be able to forward them to the respective user(s). The results may be encrypted so that the query router system 220 does not learn anything about the queries.

Figure 3:
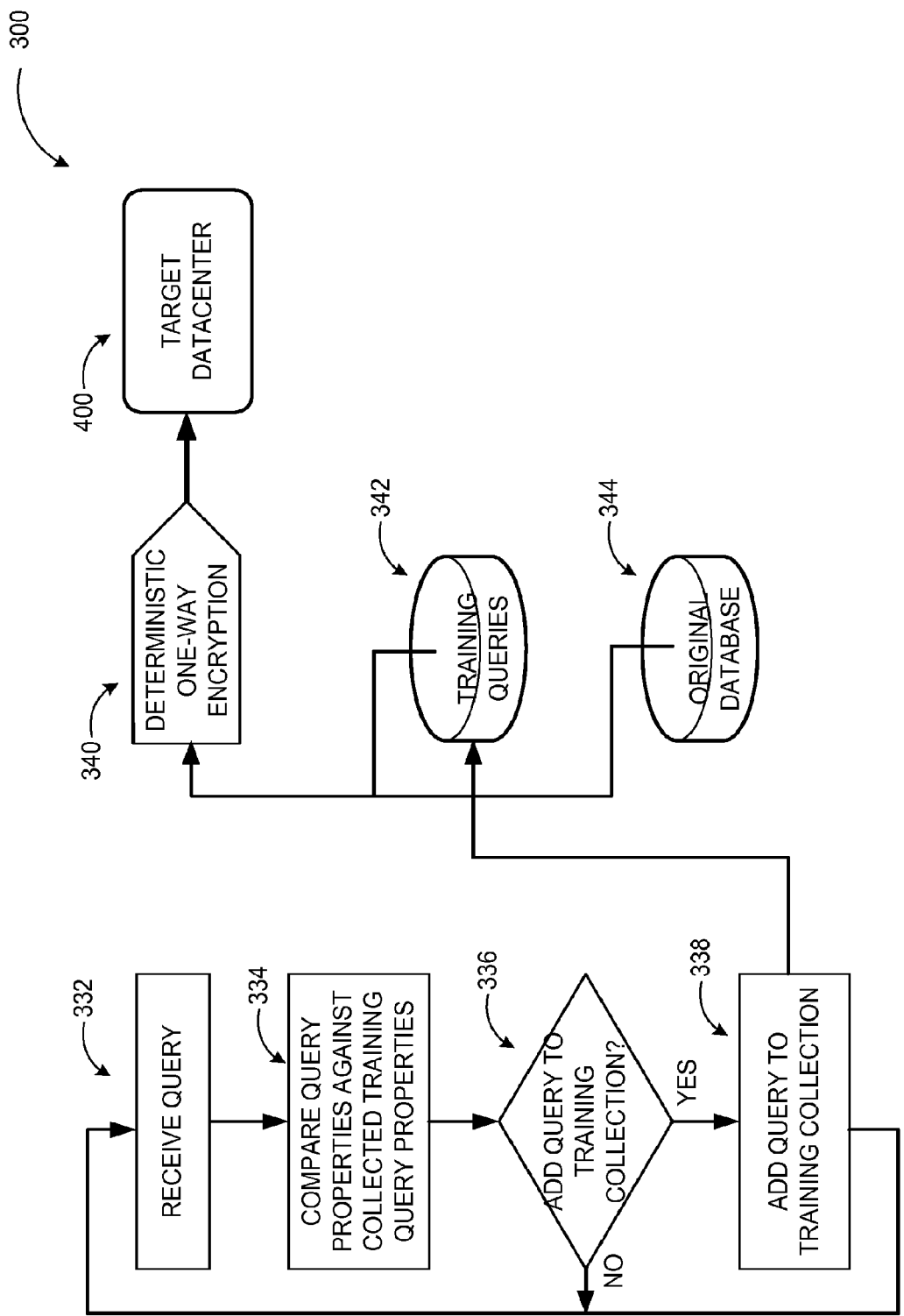
FIG. 3 illustrates actions on an origin datacenter side of a migration path for determining user key-value storage needs by providing a population of example queries.

FIG. 3 illustrates actions on an origin datacenter side of a migration path for determining user key-value storage needs by providing a population of example queries, arranged in accordance with at least some embodiments described herein.

Example embodiments provide for a datacenter of origin to collect and provide a population of queries that may be used by the destination datacenter to design and train indices using automation. The queries are typically an unambiguous representation of the usage that a data store experiences. Thus, providing a suitable collection of them—without compromising privacy or security—may allow customers to test real-world performance of a data store at a destination datacenter.

A diagram 300 in FIG. 3 depicts actions on the origin datacenter side for sending training materials (example queries) to a target datacenter 400 to enable the construction and test of a set of similar database access structures. The construction and test of database access structures at the target datacenter 400 similar to those at the origin datacenter may be performed without transferring readable data. The origin data center may have a query processing loop between blocks 332 and 338, in which it receives queries at block 332 "RECEIVE QUERIES", compares properties of the received queries against properties of a training queries sample 342 collected so far at block 334 "COMPARE QUERY PROPERTIES AGAINST COLLECTED TRAINING QUERY PROPERTIES", decides whether or not to add a new query to the training queries sample 342 at decision block 336 "ADD QUERY TO TRAINING COLLECTION?", and either adds the new query to the collection at block 338 "ADD QUERY TO TRAINING COLLECTION" or not before looping back to block 332 again.

This looped process may result in the collection of training queries sample 342, which are representative of all queries associated with database 344. In some examples, where the customer data may be considered sensitive, both the collection of training queries sample 342 and the database 344 may be run through a deterministic one-way encryption 340 resulting in a collection of hashed training queries and a hashed database at the target datacenter 400. The encryption and data representations may be matched so that queries of the encrypted database using encrypted queries result in the same record matching and output equivalents as they would on the unencrypted data. Encryption and hashing may be considered interchangeable as used herein.

In selecting queries to add to the collection of training queries sample 342, attention may be paid to ensuring that the training queries be a representative sampling across cardinalities. One approach to selecting queries as training queries may be simply including a very large population of queries (e.g. 500,000 randomly selected queries or all queries in a month) in the collection of training queries sample 342. If this approach results in an unreasonable amount of data being collected, statistical methods may be employed to select a representative example of the origin datacenter queries. To reduce the size of the training collection, the sampling time period may be shortened, the origin datacenter may use the comparison (block 334) to determine the degree to which the terms of the search are already represented in the collection of training queries sample 342 or the targeted training collection size and base the inclusion decision on a goal of getting proportionality equivalent to the cardinalities in the already performing indices at the origin datacenters. Training queries may be provided to the target datacenter all at once or in multiple smaller deliveries.

Figure 4:
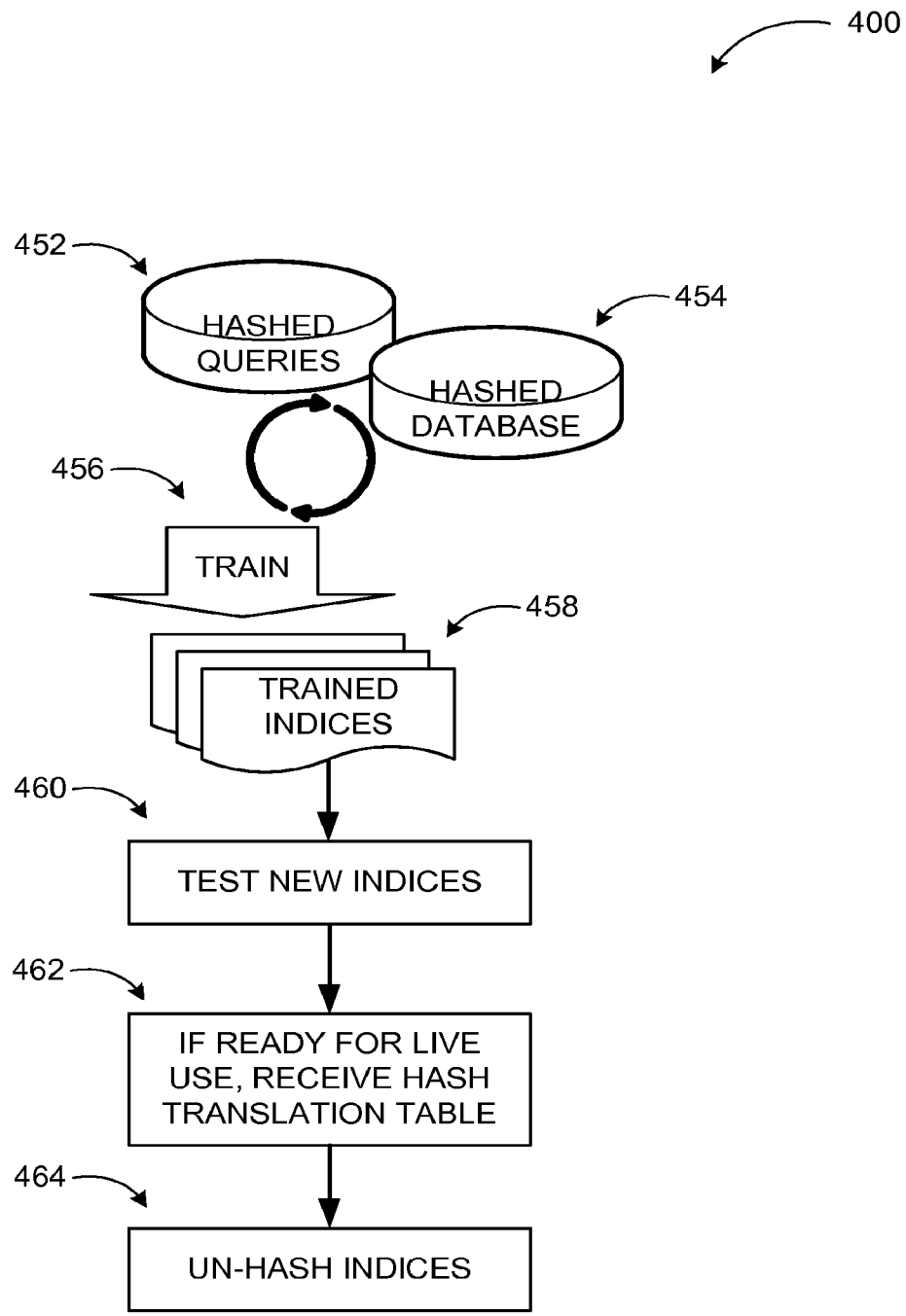
FIG. 4 illustrates actions on destination datacenter side of a migration path for determining user key-value storage needs by providing a population of example queries.

FIG. 4 illustrates actions on destination datacenter side of a migration path for determining user key-value storage needs by providing a population of example queries, arranged in accordance with at least some embodiments described herein.

The example actions for constructing and testing of database access structures at the target datacenter 400 are for the example scenario of training queries being encrypted at the origin datacenter for security and/or privacy purposes. As a result of receiving deterministically encrypted training queries from the origin datacenter, a hashed training query collection 452 and a hashed database 454 may be created at the target datacenter 400. The hashed training query collection 452 and the hashed database 454 cannot be reversed, although there is a one-to-one relationship between each value and its hash, at least within the database. The hashed training query collection 452 and the hashed database 454 constitute the requirements for automated training 456, which is typically a repetitive process and may involve a number of auto-training techniques. An output of the automated training 456 may be a set of trained indices 458 even though no plaintext data is yet available to the target datacenter 400. The customer may test a performance of the new indices at block 460 "TEST NEW INDICES".

If the target datacenter performance is found adequate, the customer may transfer a copy of a hash translation table at block 462 "IF READY FOR LIVE USE, RECEIVE HASH TRANSLATION TABLE" in order to un-hash the indices at block "UN-HASH INDICES" so they can be used on the target datacenter database. This technique enables the target datacenter 400 to train indices before the customer data arrives so that database performance can be relatively high immediately. The transfer decision may also be cancelled at any time without any data being accessible at the target datacenter 400, alleviating any data leakage concerns.

Encryption of one or both of the database and the training queries may be used if the customer wishes to test the target datacenter 400 without transferring accessible data. For example, this may be used to test the ability of a new datacenter to satisfy customer performance requirements without any concerns of data transfer security.

Deterministic encryption is an encryption type, where each set of plaintext has a unique cyphertext that is not context dependent. Such encryptions are useful because they allow, for example, the encryption of both a corpus of text to be searched and a search term and the encrypted search term matches the encrypted version of the term in the corpus so that matching can be performed without knowing what either the request or the source corpus say.

One-way encryption means the cyphertext in the encryption cannot be related to the plaintext. For example, a conventional encryption method may be employed and the encryption key discarded so that the flow cannot be reversed. One-way encryption may protect even against "dictionary" attacks that attempt to match values by encrypting all possible inputs and performing a comparison, provided that the encryption key is discarded along with the decryption key so that the algorithm that was used to encrypt cannot be determined.

As noted above, the origin database and queries may be converted in such a way that the queries match the data and a translation table for the values can be maintained according to some embodiments without employing deterministic and/or one-way encryption. When the indices are trained, the translation table may be used to convert the trained indices and/or the database to usable unencrypted versions by substitution. In other examples, no encryption at all may be used in the transfer and training process and the relevant process steps eliminated.

Figure 5:
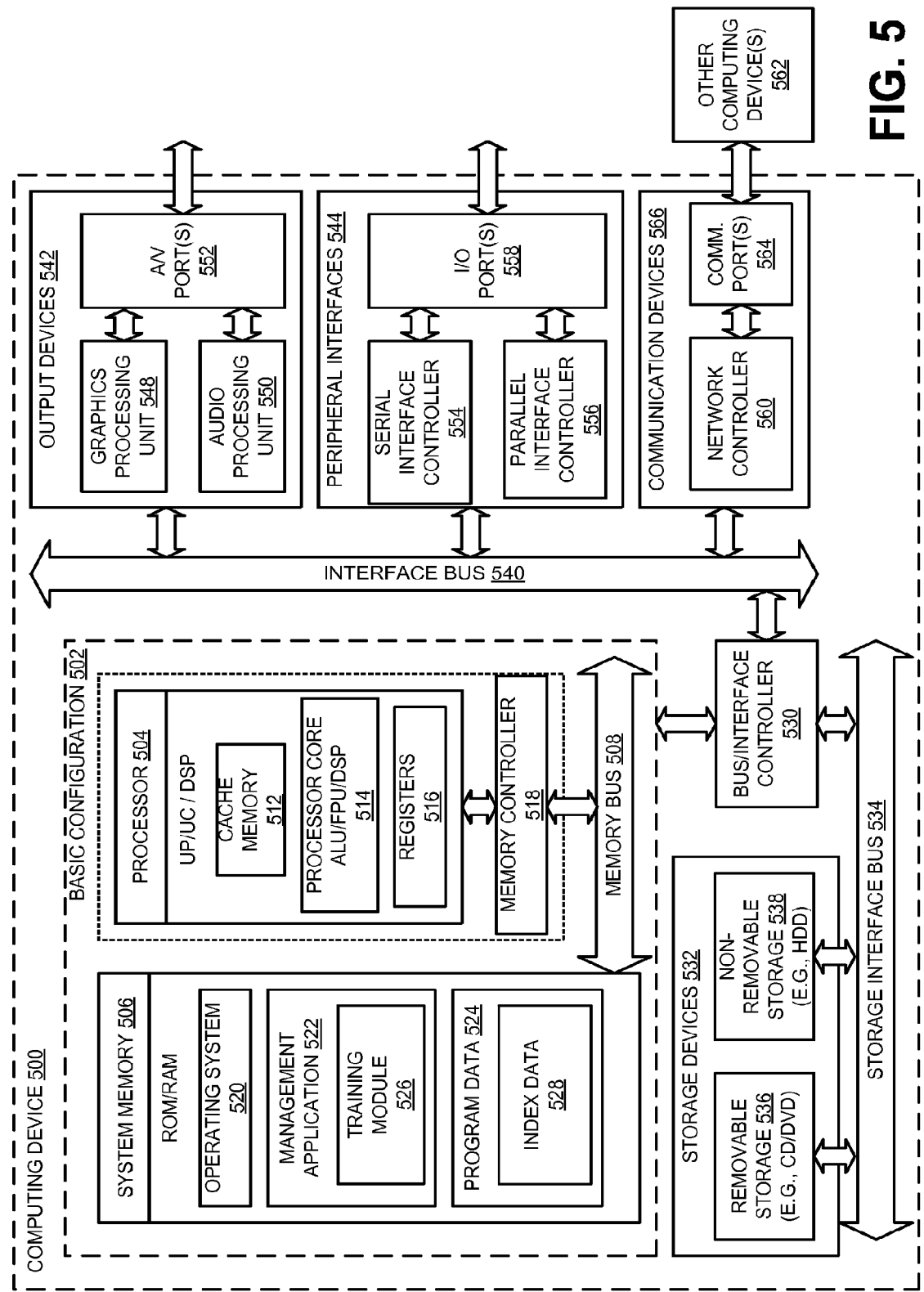
FIG. 5 illustrates a general purpose computing device, which may be used to determine user key-value storage needs by providing a population of example queries.

FIG. 5 illustrates a general purpose computing device 500, which may be used to determine user key-value storage needs by providing a population of example queries, arranged in accordance with at least some embodiments described herein. For example, the computing device 500 may be used as servers 104, 114, or 118 of FIG. 1. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The applications 522 may include a cloud management application, including a training module 526, which may determine user key-value storage needs by providing a population of example queries as described herein. The program data 524 may include, among other data, index data 528, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for maintaining application performances upon transfer between cloud servers. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
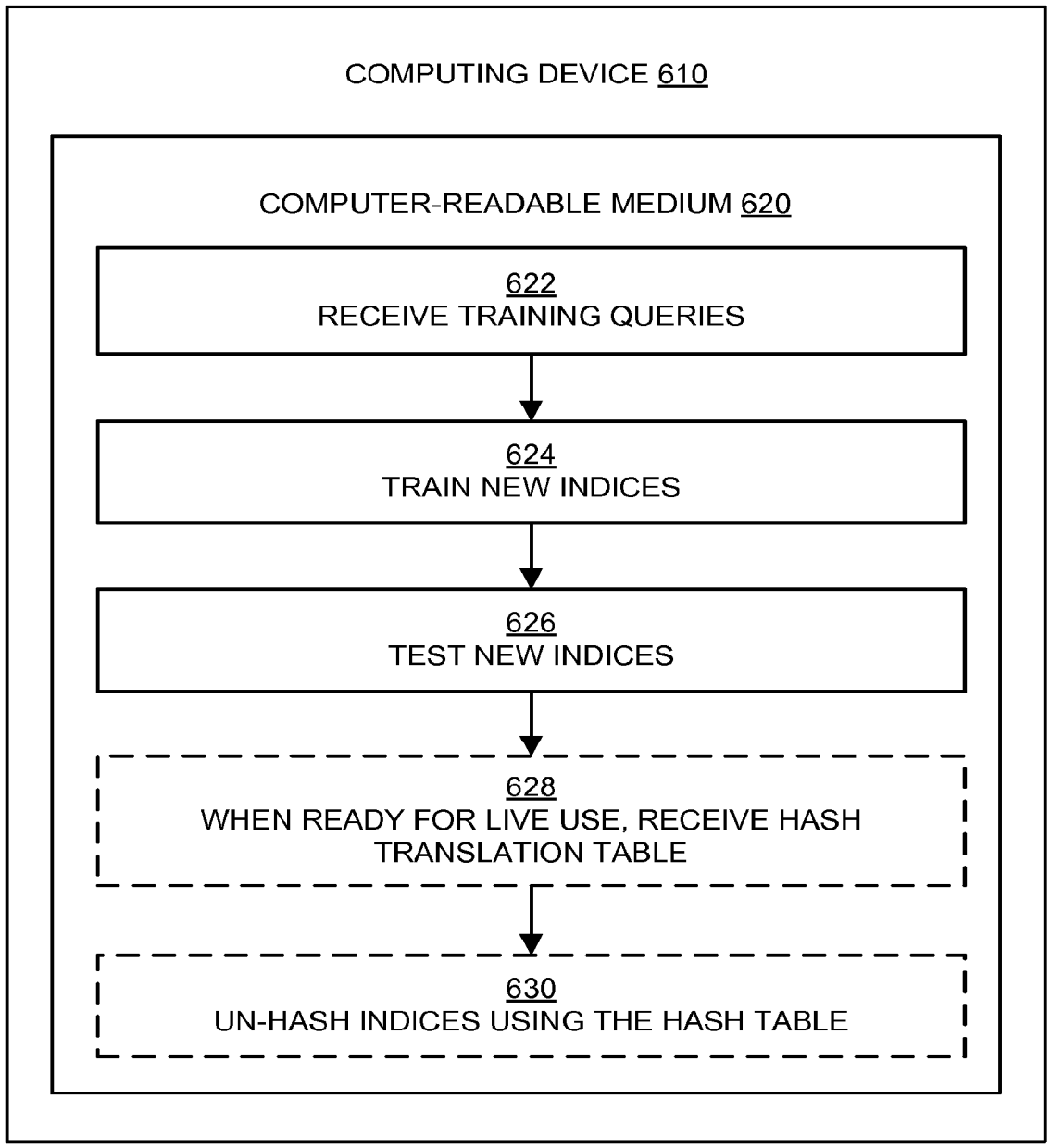
FIG. 6 is a flow diagram illustrating an example method that may be performed by a computing device such as the device in FIG. 5.

FIG. 6 is a flow diagram illustrating an example method that may be performed by a computing device such as the computing device 500 in FIG. 5, arranged in accordance with at least some embodiments described herein. Example methods may include one or more operations, functions or actions as illustrated by one or more of blocks 622, 624, 626, 628, and/or 630. The operations described in the blocks 622 through 630 may also be stored as computer-executable instructions in a computer-readable medium such as a computer-readable medium 620 of a computing device 610.

An example process determining user key-value storage needs by providing a population of example queries may begin with block 622, "RECEIVE TRAINING QUERIES", where a training module or application (e.g., the training module 526) executed on a server (e.g., the servers 104, 118, or 114 of FIG. 1) may receive a collection of training queries from the origin datacenter. The training queries may be selected based on statistical or similar methods to represent all queries submitted to the origin datacenter.

Block 622 may be followed by block 624, "TRAIN NEW INDICES", where the training module 526 may train new indices for the target datacenter based on received training queries. In a system employing deterministic one-way encryption for data security purposes, hashed queries and a hashed database may be used in an iterative training process such as an auto-learning process.

Block 624 may be followed by block 626, "TEST NEW INDICES", where the new indices may be tested at the target datacenter for performance (e.g., processing time, read time, write time, and so on) with or without accessible data being transferred to the target datacenter.

Block 626 may be followed by optional block 628, "WHEN READY FOR LIVE USE, RECEIVE HASH TRANSLATION TABLE", where a hash table may be received, for example, from a customer, upon receiving an indication for actual customer migration to the target datacenter. The hash table may be employed in cases of encrypted data transfer. Optional block 628 may be followed by optional block 630, "UN-HASH INDICES USING THE RECEIVED HASH TABLE", where the hashed indices may be un-hashed using the received hash table at the target datacenter.

The blocks included in the above described process are for illustration purposes. Determining user key-value storage needs by providing a population of example queries may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 7 illustrates a block diagram of an example computer program product arranged in accordance with at least some embodiments described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the migration module 526 may undertake one or more of the tasks shown in FIG. 7 in response to the instructions 704 conveyed to the processor 504 by the medium 702 to perform actions associated with determining user key-value storage needs by providing a population of example queries as described herein. Some of those instructions may include, for example, instructions for receiving training queries from an origin datacenter, training indices, testing new indices, receiving a hash translation table when ready for live use, and un-hashing indices according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 704 by an RF signal bearing medium, where the signal bearing medium 702 is conveyed by the wireless communications medium 710 (e.g., a wireless communications medium conforming with the IEEE 802.11 standard).

According to some examples, a method for determining customer key-value storage needs through example queries in transfers between cloud computing environments may include receiving training queries from an origin datacenter, training new indices for a target datacenter, testing the new indices for performance at the target datacenter, and activating an index database at the target datacenter with the new indices in response to receiving a request for customer migration.

According to other examples, the method may also include comparing properties of queries submitted to the origin datacenter to properties of a collection of the training queries, increasing a number of the training queries based on the comparison, and providing the collection of the training queries to the target datacenter through deterministic one-way encryption. The method may further include generating a collection of hashed queries and a hashed database at the target datacenter based on the encrypted collection of training queries received from the origin datacenter and/or training the target datacenter to create new indices based on the collection of hashed queries and the hashed database through auto-learning. The method may also include upon receiving the request for the customer migration, receiving a hash table and un-hashing the hashed indices employing the received hash table.

According to further examples, comparing the properties of the queries may include determining a degree to which terms of a search are represented in the collection of the training queries. Comparing the properties of the queries may be limited based on a size of the collection of the training queries. Comparing the properties of the queries may also be based on obtaining a proportionality equivalent to cardinalities in existing indices at the origin datacenter. The method may further include selecting the training queries based on a statistical analysis of queries submitted to the origin datacenter. The method may also include selecting the training queries by choosing queries submitted to the origin datacenter over a predefined time period.

According to yet other examples, transferring of training queries, training of the new indices, and testing of the new indices may be managed by one of the origin datacenter or a third party service. Transferring of training queries, training of the new indices, and testing of the new indices may also be managed by the target datacenter. The target datacenter may enable a customer to test-drive the target datacenter without a migration commitment. The method may also include employing a filter and/or an anonymizer to adhere to data sharing rules and restrictions.

According to other examples, a computing device for determining customer key-value storage needs through example queries in transfers between cloud computing environments may include a memory configured to store instructions and a processing unit configured to execute a training module in conjunction with the instructions. The training module may receive training queries from an origin datacenter, train new indices for a target datacenter, test the new indices for performance at the target datacenter, and activate an index database at the target datacenter with the new indices in response to receiving a request for customer migration.

According to some examples, the training module may further compare properties of queries submitted to the origin datacenter to properties of a collection of the training queries, increase a number of the training queries based on the comparison, and provide the collection of the training queries to the target datacenter through deterministic one-way encryption. The training module may also generate a collection of hashed queries and a hashed database at the target datacenter based on the encrypted collection of training queries received from the origin datacenter and/or train the target datacenter to create new indices based on the collection of hashed queries and the hashed database through auto-learning. The training module may further receive a hash table upon receiving the request for the customer migration and un-hash the hashed indices employing the received hash table.

According to further examples, the properties of the queries may be compared by determining a degree to which terms or types of a search are represented in the collection of the training queries. The comparison of the properties of the queries may be limited based on a size of the collection of the training queries. The comparison of the properties of the queries may also be based on obtaining a proportionality equivalent to cardinalities in existing indices at the origin datacenter. The training module may further select the training queries based on a statistical analysis of all queries submitted to the origin datacenter.

According to yet other examples, the training module may select the training queries by choosing queries submitted to the origin datacenter over a predefined time period. The computing device may be part of one of the origin datacenter or a third party service. Alternatively, the computing device may be part of the target datacenter and the target datacenter may enable a customer to test-drive the target datacenter without a migration commitment. The training module may further employ a filter and/or an anonymizer to adhere to data sharing rules and restrictions.

According to further examples, a computer-readable storage medium may have instructions stored thereon for determining customer key-value storage needs through example queries in transfers between cloud computing environments. The instructions may include receiving training queries from an origin datacenter, training new indices for a target datacenter, testing the new indices for performance at the target datacenter, and activating an index database at the target datacenter with the new indices in response to receiving a request for customer migration.

According to some examples, the instructions may also include comparing properties of queries submitted to the origin datacenter to properties of a collection of the training queries, increasing a number of the training queries based on the comparison, and providing the collection of the training queries to the target datacenter through deterministic one-way encryption. The instructions may further include generating a collection of hashed queries and a hashed database at the target datacenter based on the encrypted collection of training queries received from the origin datacenter and/or training the target datacenter to create new indices based on the collection of hashed queries and the hashed database through auto-learning. The instructions may also include upon receiving the request for the customer migration, receiving a hash table and un-hashing the hashed indices employing the received hash table.

According to other examples, comparing the properties of the queries may include determining a degree to which terms of a search are represented in the collection of the training queries. Comparing the properties of the queries may be limited based on a size of the collection of the training queries. Comparing the properties of the queries may also be based on obtaining a proportionality equivalent to cardinalities in existing indices at the origin datacenter. The instructions may further include selecting the training queries based on a statistical analysis of all queries submitted to the origin datacenter. The instructions may also include selecting the training queries by choosing queries submitted to the origin datacenter over a predefined time period.

According to yet other examples, transferring of training queries, training of the new indices, and testing of the new indices may be performed by one of the origin datacenter or a third party service. Transferring of training queries, training of the new indices, and testing of the new indices may also be performed by the target datacenter. The target datacenter may enable a customer to test-drive the target datacenter without a migration commitment. The instructions may also include employing a filter and/or an anonymizer to adhere to data sharing rules and restrictions.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to determine customer key-value storage needs through example queries in transfers between cloud computing environments, the method comprising:
receiving training queries from an origin datacenter;
comparing properties of queries submitted to the origin datacenter to properties of a collection of the training queries;
increasing a number of the training queries based on the comparison;
training new indices for a target datacenter based on the increased number of training queries, wherein the new indices are trained without transfer of readable data from the training queries to the target datacenter;
testing the new indices for performance at the target datacenter, wherein the new indices are tested without transfer of readable data from the training queries to the target datacenter; and
in response to receiving a request for customer migration, activating an index database at the target datacenter with the new indices.

2. The method according to claim 1, further comprising:
providing the increased number of training queries to the target datacenter through deterministic one-way encryption.

3. The method according to claim 2, further comprising:
generating a collection of hashed queries and a hashed database at the target datacenter based on the encrypted collection of the increased number of training queries received from the origin datacenter.

4. The method according to claim 3, further comprising:
training the target datacenter to create new hashed indices based on the collection of hashed queries and the hashed database through auto-learning.

5. The method according to claim 3, further comprising:
upon receiving the request for the customer migration, receiving a hash table; and
un-hashing the hashed indices employing the received hash table.

6. The method according to claim 2, wherein comparing the properties of the queries includes determining a degree to which terms of a search are represented in the collection of the training queries.

7. The method according to claim 2, wherein comparing the properties of the queries is limited based on a size of the collection of the training queries.

8. A computing device to determine customer key-value storage needs through example queries in transfers between cloud computing environments, the computing device comprising:
a memory configured to store instructions; and
a processing unit configured to execute a training module in conjunction with the instructions, wherein the training module is configured to:
receive training queries from an origin datacenter;
compare properties of queries submitted to the origin datacenter to properties of a collection of the training queries;
increase a number of the training queries based on the comparison;
provide the increased number of training queries to a target datacenter through deterministic one-way encryption;
train new indices for the target datacenter based on the increased number of training queries;
test the new indices for performance at the target datacenter, wherein the target datacenter enables a customer to test the new indices for performance without a commitment to a customer migration; and
in response to receiving a request for the customer migration, activate an index database at the target datacenter with the new indices.

9. The computing device according to claim 8, wherein the comparison of the properties of the queries is based on obtaining a proportionality equivalent to cardinalities in existing indices at the origin datacenter.

10. The computing device according to claim 8, wherein the training module is further configured to:
select the training queries based on a statistical analysis of queries submitted to the origin datacenter.

11. The computing device according to claim 8, wherein the training module is further configured to:
select the training queries by choosing queries submitted to the origin datacenter over a predefined time period.

12. The computing device according to claim 8, wherein the computing device is part of one of the origin datacenter or a third party service.

13. The computing device according to claim 8, wherein the computing device is part of the target datacenter.

14. A computer-readable storage medium having instructions stored thereon to determine customer key-value storage needs through example queries in transfers between cloud computing environments, the instructions comprising:
receiving training queries from an origin datacenter;
comparing properties of queries submitted to the origin datacenter to properties of a collection of the training queries;
increasing a number of the training queries based on the comparison;
providing the increased number of training queries to a target datacenter through deterministic one-way encryption;
training new indices for the target datacenter based on the increased number of training queries, wherein the new indices are trained without transfer of readable data from the training queries to the target datacenter;
testing the new indices for performance at the target datacenter, wherein the target datacenter enables a customer to test the new indices for performance without a commitment to a customer migration and the new indices are tested without transfer of readable data from the training queries to the target datacenter; and
in response to receiving a request for customer migration, activating an index database at the target datacenter with the new indices.

15. The computer-readable storage medium according to claim 14, wherein the instructions further comprise:
generating a collection of hashed queries and a hashed database at the target datacenter based on the encrypted collection of the increased number of training queries received from the origin datacenter; and
training the target datacenter to create new hashed indices based on the collection of hashed queries and the hashed database through auto-learning.

16. The computer-readable storage medium according to claim 15, wherein the instructions further comprise:
   upon receiving the request for the customer migration, receiving a hash table; and
   un-hashing the hashed indices employing the received hash table.

17. The computer-readable storage medium according to claim 14, wherein comparing the properties of the queries includes determining a degree to which terms of a search are represented in the collection of the training queries based on obtaining a proportionality equivalent to cardinalities in existing indices at the origin datacenter.

18. The computer-readable storage medium according to claim 14, wherein the instructions further comprise:
   selecting the training queries based on a statistical analysis of queries submitted to the origin datacenter; and/or
   selecting the training queries by choosing queries submitted to the origin datacenter over a predefined time period.

19. The computer-readable storage medium according to claim 14, wherein the instructions further comprise:
   employing one or more of a filter and/or an anonymizer to adhere to data sharing rules and restrictions.

\* \* \* \* \*

UNITED STATES PATENT AND TRADEMARK OFFICE
CERTIFICATE OF CORRECTION

PATENT NO. : 8,849,757 B2  
APPLICATION NO. : 13/640469  
DATED : September 30, 2014  
INVENTOR(S) : Ezekiel Kruglick Page 1 of 1

It is certified that error appears in the above-identified patent and that said Letters Patent is hereby corrected as shown below:

In the Drawings:

In Fig. 5, Sheet 5 of 7, second row third line, delete "uP/uC/DSP" and insert -- µP/µC/DSP --, therefor.

In the Specification:

In Column 1, line 4, following Title and prior to Background section insert
-- CROSS REFERENCE TO RELATED APPLICATIONS
This Application is the National Stage filing under 35 U.S.C. § 371 of PCT Application Ser. No. PCT/US12/31317 filed on March 29, 2012. The PCT Application is herein incorporated by reference in its entirety. --, therefor.

Signed and Sealed this
Eighth Day of September, 2015

Michelle K. Lee
*Director of the United States Patent and Trademark Office*